United States Patent [19]

Johnson

[11] 4,249,842
[45] Feb. 10, 1981

[54] SELF LOADING MULTIPLE BALE TRAILER

[76] Inventor: Howard L. Johnson, 4500 NW. 108th St., Kansas City, Mo. 64154

[21] Appl. No.: 947,168

[22] Filed: Sep. 28, 1978

[51] Int. Cl.³ .......................... B60P 1/38; B60P 1/46; A01D 87/12
[52] U.S. Cl. ................. 414/24.5; 414/24.6; 414/501; 414/541; 414/785
[58] Field of Search ............. 414/24.5, 24.6, 44, 414/111, 497, 501, 434, 435, 437, 438, 541, 542, 551, 553, 665, 666, 669, 670, 785; 56/473.5, 474, 477

[56] References Cited

U.S. PATENT DOCUMENTS

| | | | |
|---|---|---|---|
| 2,823,813 | 2/1958 | Shimmon | 414/541 |
| 3,174,634 | 3/1965 | Peck | 414/541 |
| 3,416,686 | 12/1968 | Penrod | 414/785 X |
| 3,504,810 | 4/1970 | Walda | 414/541 |
| 3,587,882 | 6/1971 | Friday et al. | 414/541 X |
| 3,803,925 | 4/1974 | Jackson | 414/694 X |
| 3,924,765 | 12/1975 | Hostetler | 414/501 |
| 4,042,140 | 8/1977 | McFarland | 414/551 X |
| 4,084,707 | 4/1978 | McFarland | 414/501 X |
| 4,117,940 | 10/1978 | Adam | 414/541 |
| 4,133,437 | 1/1979 | Gates | 414/541 |

Primary Examiner—Leslie J. Paperner
Attorney, Agent, or Firm—Fishburn, Gold and Litman

[57] ABSTRACT

A self loading multiple bale trailer comprises an elongated trailer frame with a belt conveyor extending from end to end and a lift fork for engagement at the lower periphery of a large round bale at the side of the trailer, for example, by forward motion of a tow vehicle. The lift fork is supported on a frame which is connected by an arm to a sleeve slidable on a verticle shaft and having an hydraulic cylinder for lifting the bale. The sleeve is also rotatable about a vertical axis to swing the lifted bale a half circle from the side of the trailer to a position over the conveyor for deposit thereon. The conveyor is operable to move the deposited bale to a desired position along the trailer, and may also be used to discharge the bale from the rear of the trailer or to reengage the lift fork with the bale. In an alternative form, the bale may be handled by a penetrating spike instead of lift fork legs, which spike may be utilized, in a quarter turn position, in unwinding the bale for feeding.

20 Claims, 20 Drawing Figures

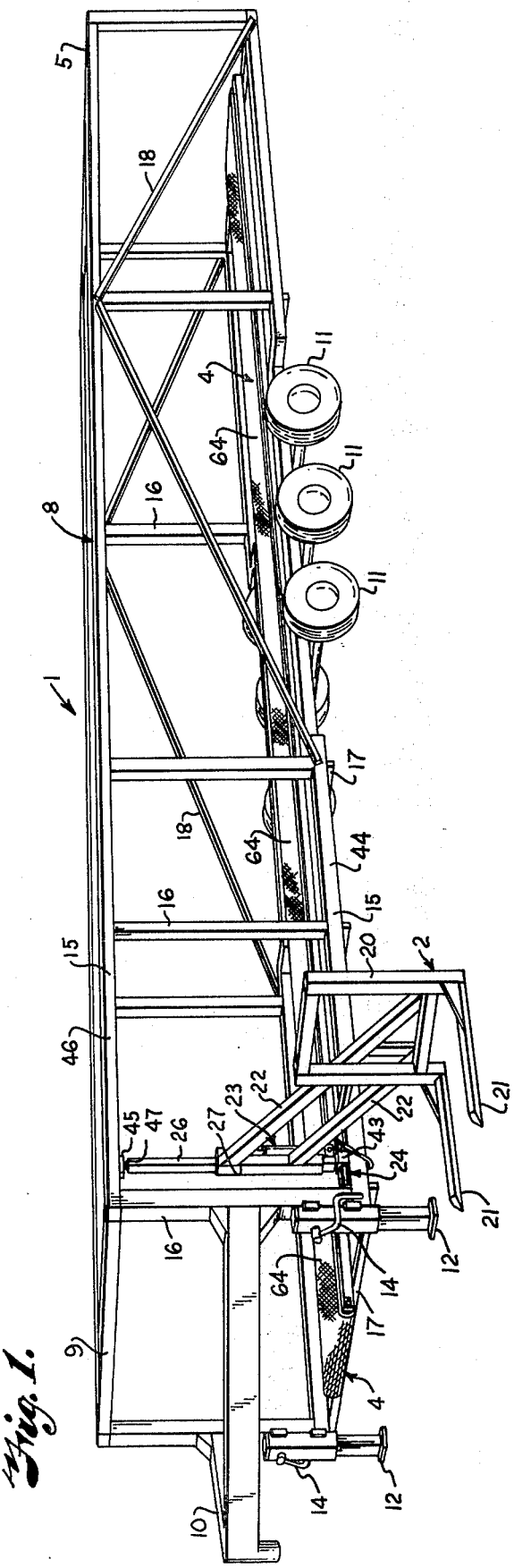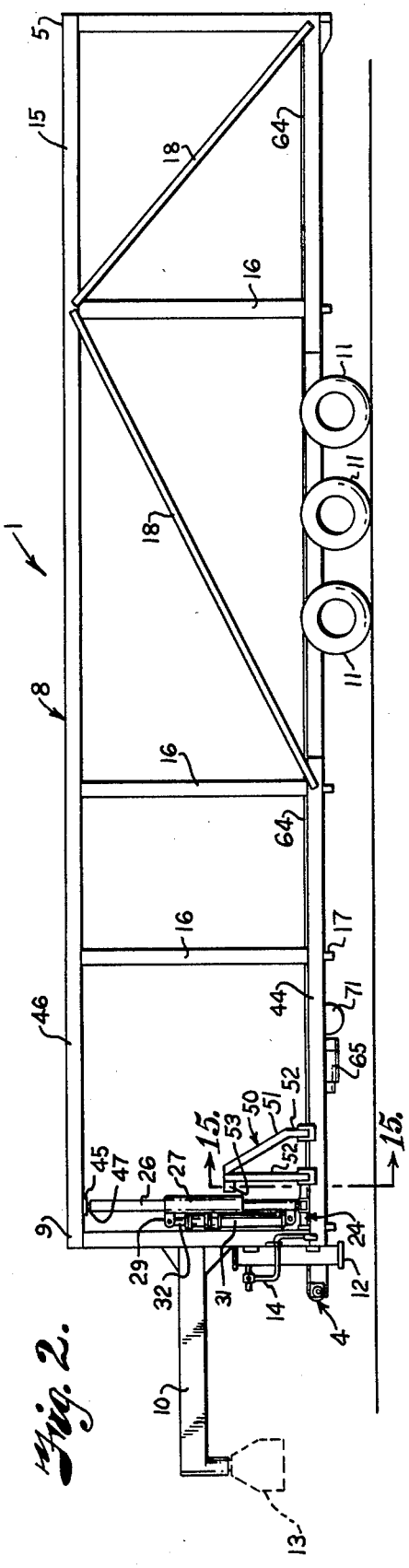

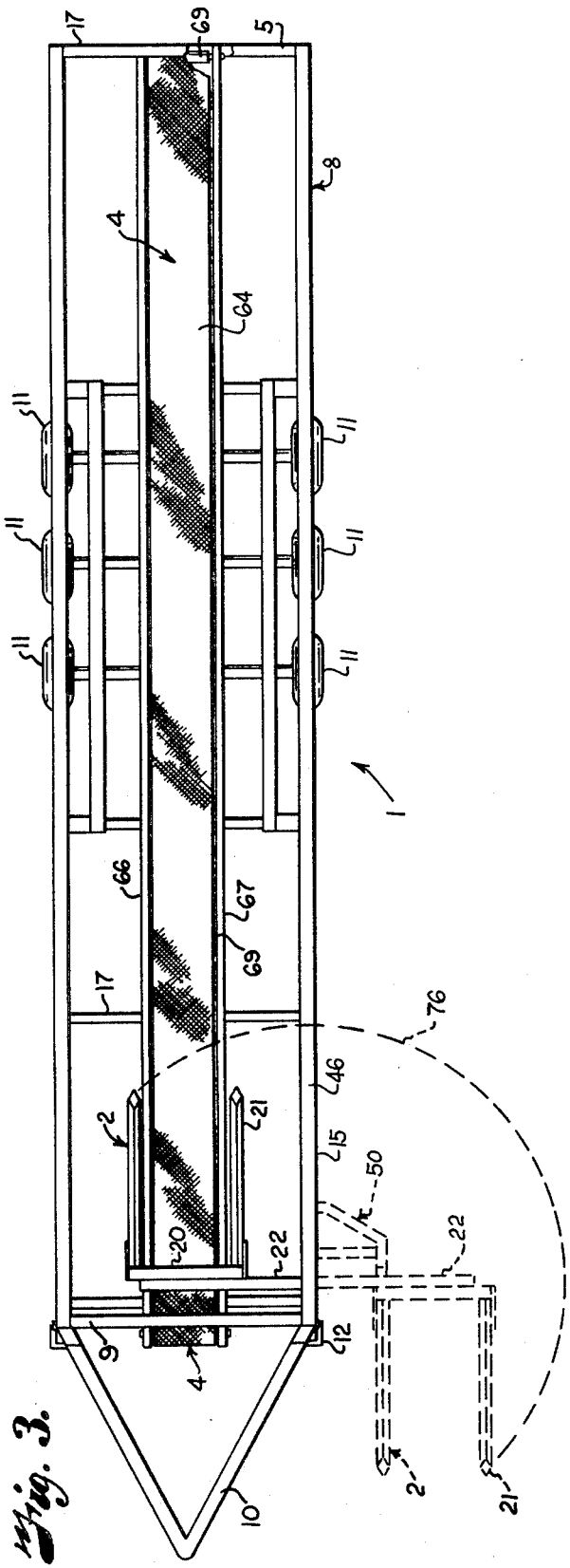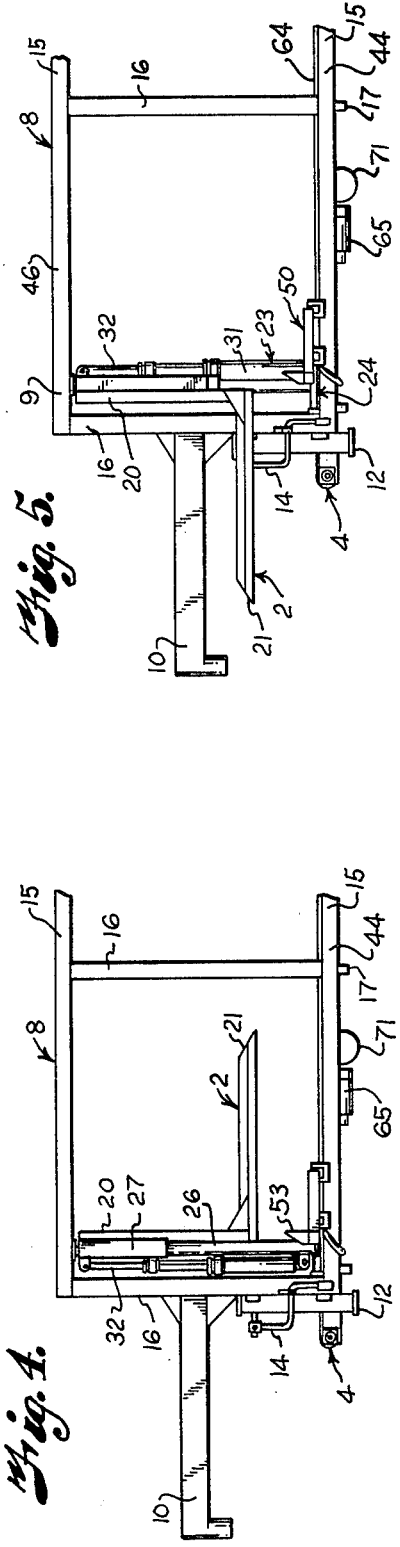

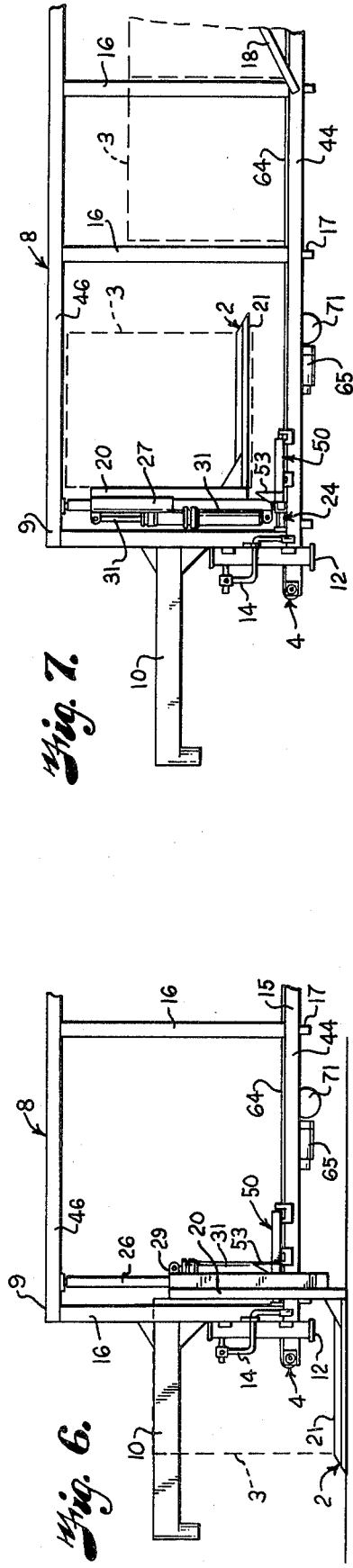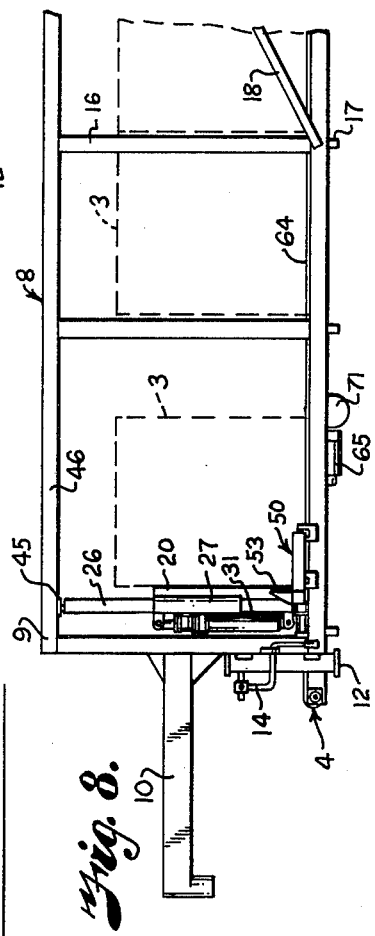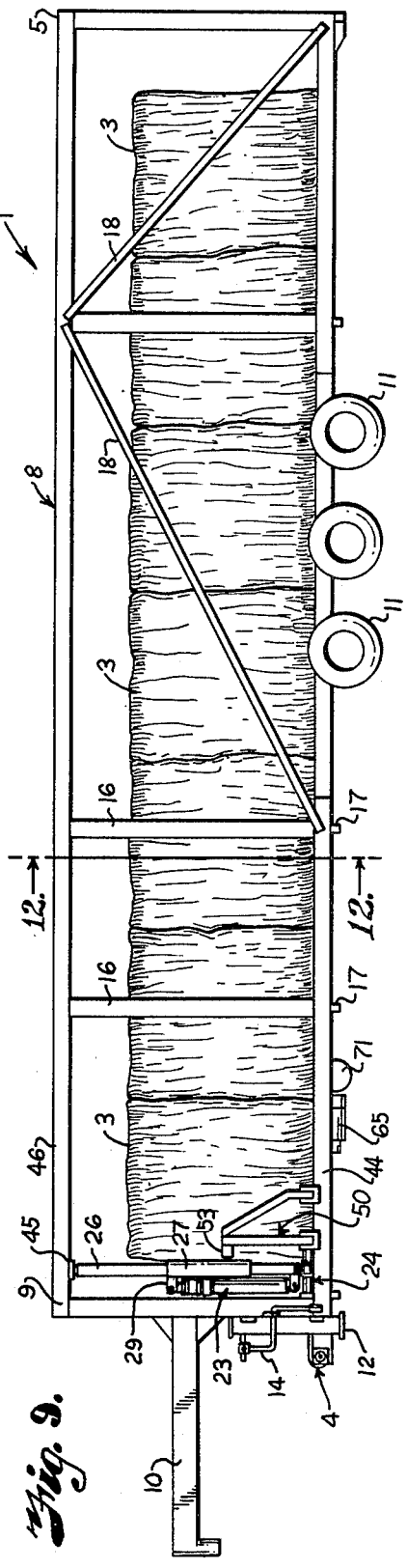

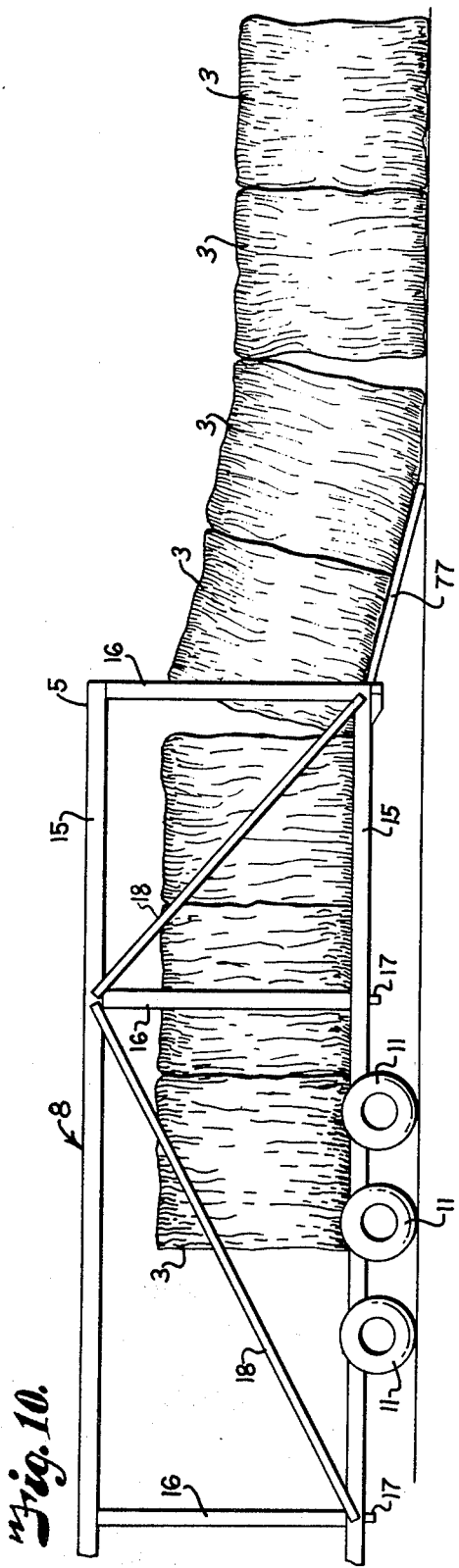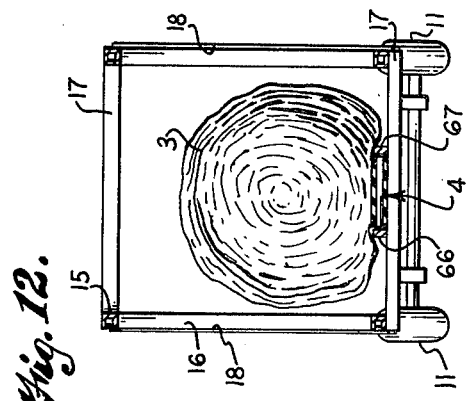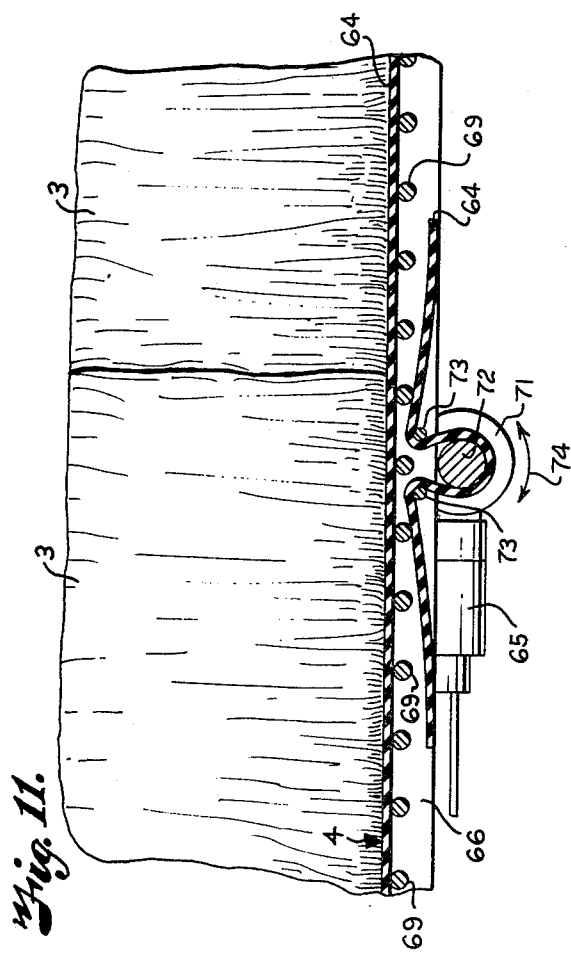

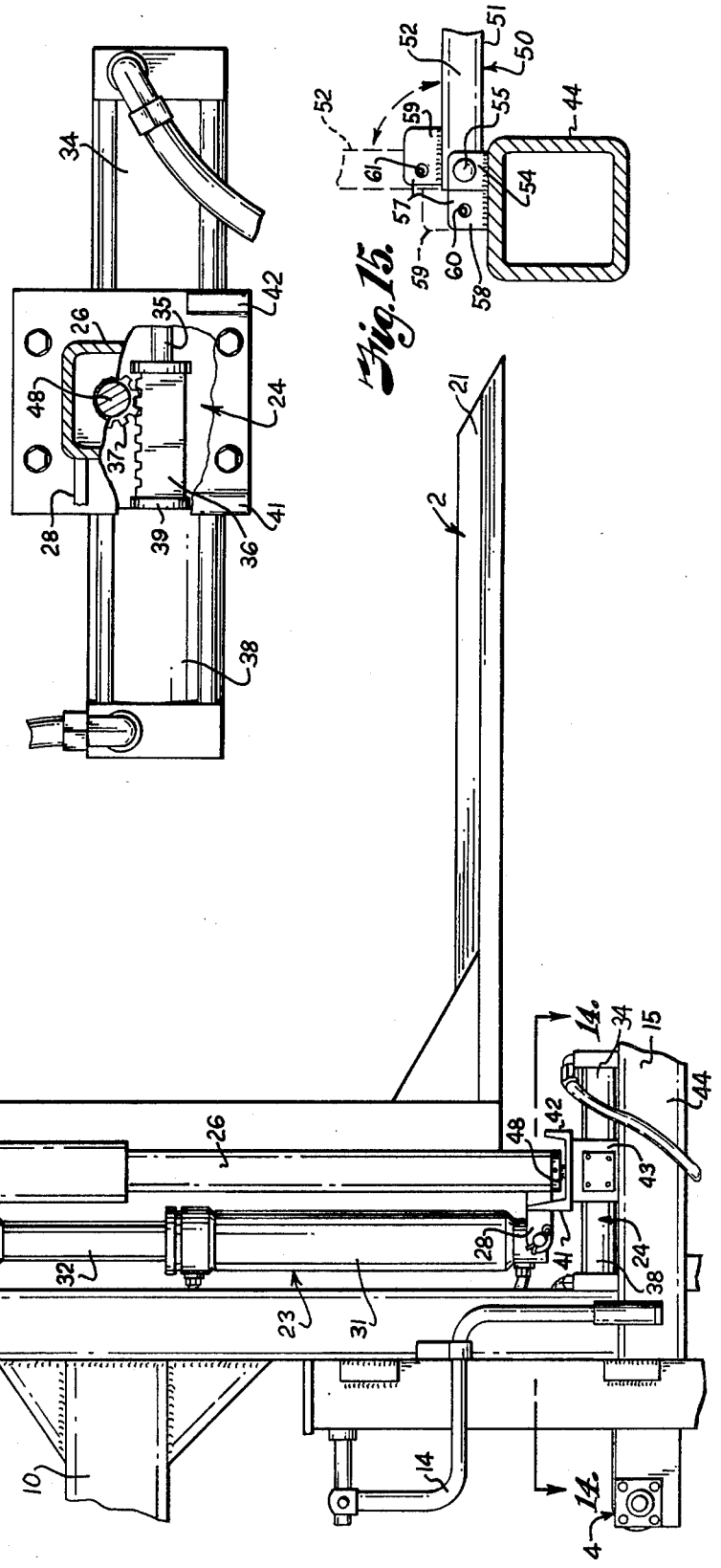

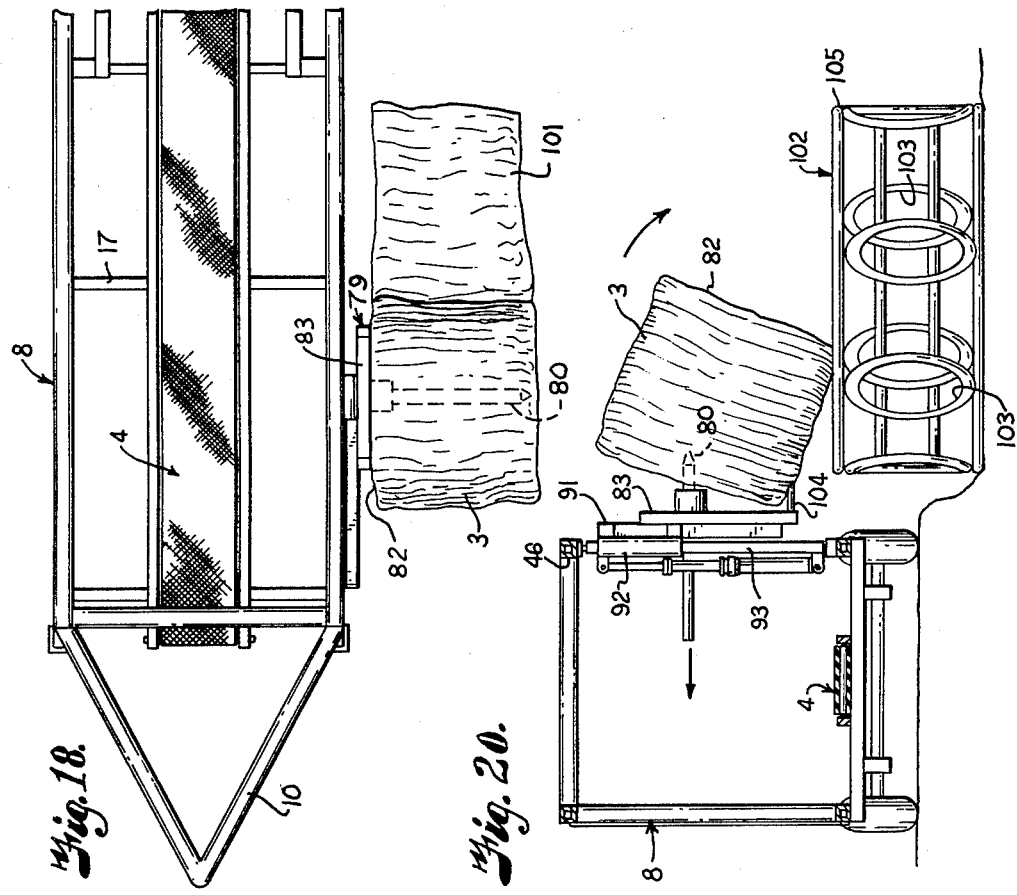
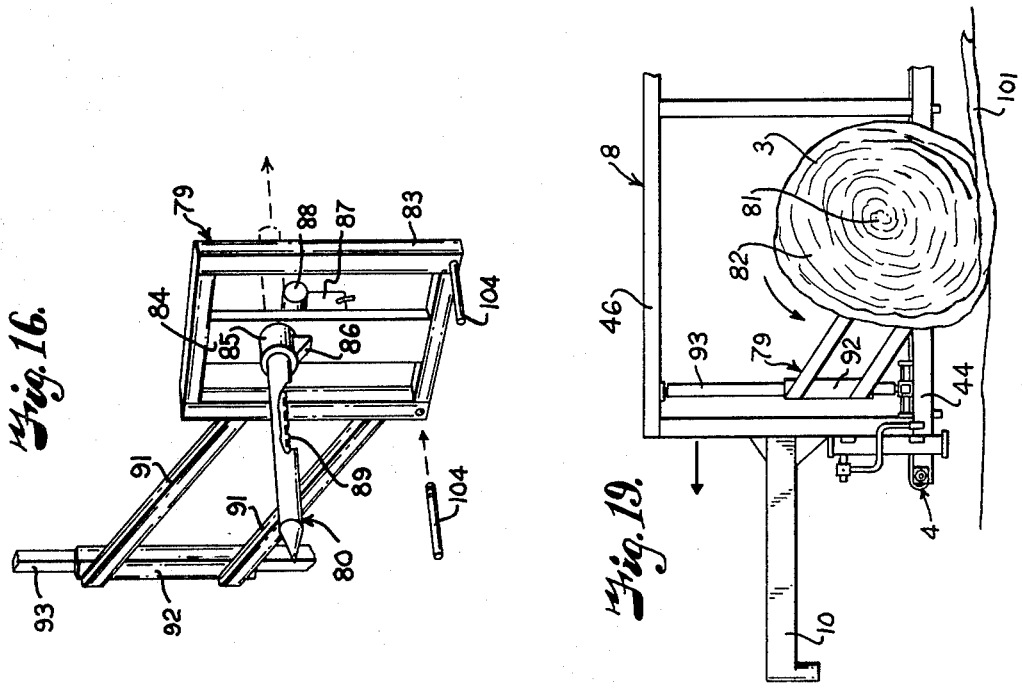

SELF LOADING MULTIPLE BALE TRAILER

The present invention relates to large round bale handling apparatus and more particularly to a multi-bale side loading trailer which is operable to load by lifting and swinging a bale about a vertical axis, thereby maintaining the original rotational orientation of the bale.

Self loading multi-bale trailers are used on large livestock ranches in order to efficiently transport large numbers of large cylindrical bales from the production fields to points of storage and use. Such trailers generally include some means of loading and positioning the bales on the trailer. Bales are engaged by most trailers by movement of the tow vehicle. Some trailers tilt the bed of the trailer to load bales on one of the ends of the trailer. Tilting of a trailer loaded with several bales involves unnecessary expenditure of energy and limits the practical size of the trailer. Trailers of this type which load at the rear end require that the bale be approached and loaded blindly. Trailers that load at the front end require a hitch arm to swing the trailer laterally into a track parallel to that of the towing vehicle. The conveyers on most of these bale trailers are of the chain type with bale engagement teeth. The teeth have a tendency to break the baling twine and are responsible for some damage to the bale itself.

Another type of loading mechanism for bale trailers is located on the side of the trailer allowing good visibility for loading without the use of a swing hitch. One such trailer pivots the bale about a horizontal axis thereby changing the original orientation of the bale during loading. It is desirable to maintain the original orientation of the bale to reduce spoilage of the hay, since whatever side or surface of the bale is down usually becomes spoiled.

The bale trailer of the present invention overcomes many of the difficulties of prior bale trailers by providing a side loading structure which maintains the original orientation of the bale, which has a relatively smooth conveyer, and which is stable enough during loading that the trailer can be constructed to maximum legal highway dimensions.

The principal objects of the present invention are: to provide a self loading multiple bale trailer for manipulating and transporting a plurality of large cylindrical bales; to provide such a trailer including a side located lift fork or spike which is operable to lift a bale and rotate same about the vertical axis whereby the original downside of the bale is maintained throughout loading, transporting, and off loading to reduced spoilage of the hay in the bale; to provide such a loader which may be loaded during forward motion of the vehicle; to provide such a trailer including a trailer bed conveyer belt which is substantially smooth to reduce damage to the bales and to provide selective slippage between the belt and the bales for close positioning of the bales on the conveyer; to provide such a trailer wherein the bales may be off-loaded from the rear of the trailer or rehandled by the fork or spike; to provide such a trailer which may utilize a loading spike for unrolling bale; to provide such a trailer which may be constructed to maximum legal highway dimensions for transporting a maximum number of bales; and to provide such a trailer which is economical to manufacture, efficient in operation, durable in use, and which is particularly well adapted for its intended purpose.

Other objects and advantages of this invention will become apparent from the following description taken in connection with the accompanying drawings wherein are set forth, by way of illustration and example, certain embodiments of this invention.

The drawings constitute a part of the specification, include an exemplary embodiment of the present invention, and illustrate various objects and features of the self loading multiple bale trailer.

FIG. 1 is a perspective view of the self loading multiple bale trailer with the lift fork shown in a bale engaging position.

FIG. 2 is a side elevational view of the trailer with the lift fork in a stowed position and a stop member in a retracted position.

FIG. 3 is a top plan view of the trailer showing the lift fork in a stowed position and showing the bale engaging position in dotted lines.

FIG. 4 is a fragmentary side elevational view showing the lift fork in a retracted, lifted position.

FIG. 5 is a view similar to FIG. 4 and shows the lift fork in an extended, lifted position.

FIG. 6 is a view similar to FIG. 4 and shows the lift fork in the bale engaging position with a bale thereon shown in dotted lines.

FIG. 7 is a view similar to FIG. 4 showing the lift fork in the retracted position with a bale thereon in preparation for deposition on the conveyer.

FIG. 8 is a view similar to FIG. 4 showing a bale in dotted lines deposited on the conveyor.

FIG. 9 is a side elevational view of the trailer loaded with bales and ready for transportation on a highway.

FIG. 10 is a fragmentary side elevational view illustrating the off-loading of bales from the rear of the trailer.

FIG. 11 is a fragmentary longitudinal sectional view of the conveyor, showing a driving motor therefor.

FIG. 12 is a transverse sectional view taken along line 12—12 of FIG. 9 and shows a bale on the conveyor.

FIG. 13 is an enlarged side elevational view illustrating details of the mechanism for lifting the lift fork.

FIG. 14 is a horizontal sectional view taken along line 14—14 of FIG. 13 and illustrating details of the mechanism for rotating the lift arm.

FIG. 15 is an enlarged fragmentary transverse sectional view taken along line 15—15 of FIG. 2 and illustrating details of the hinge connection of the stop bracket to the trailer frame and showing the vertical retracted position of the stop bracket in dotted lines.

FIG. 16 is a fragmentary perspective view showing a modified lift member including a retractible bale engaging spike.

FIG. 17 is a fragmentary top plan view showing a modified stop member for use on the trailer employing the spike.

FIG. 18 is a fragmentary top plan view of the trailer showing the position of the bale spike with bale thereon for unrolling a bale.

FIG. 19 is a fragmentary side elevational view of the spike supported bale in a partially unrolled condition.

FIG. 20 is a elevational view of the trailer with portions broken away, showing the spike support frame at a side position and illustrating retraction of the spike to deposit the bale on one of its flat sides in a hay ring.

Referring to the drawings in more detail:

The reference numeral 1 generally designates a self loading multiple bale trailer including a side located lift member or fork 2 operative to engage a large round or cylindrical bale 3 (see FIG. 6) during forward motion of a tow vehicle (not shown) and to deposit the bale 3 on a conveyor 4 extending along a bed of the trailer 1. During loading of the bale, the bale is lifted vertically, swung about a vertical axis through about 180° and deposited on the conveyor 4 such that the original rotational orientation of the bale is maintained. The bales 4 may be off loaded from a rear end 5 of the trailer by operation of the conveyor 4 during forward motion of the trailer or when stationary. In the alternative, the bale can be rehandled by the fork 2.

The trailer 1 includes a trailer frame 8 having a front end 9 and the rear end 5, with a hitch arrangement 10 constructed on the front end 9 of the trailer frame 8. The hitch arrangement 10 in the illustrated embodiment is a type of fifth wheel trailer hitch for connection to a cooperating arrangement 13 (see FIG. 2) on the bed of a pickup truck (not shown). Alternatively, the tow vehicle may be a tractor. The frame 8 includes ground engaging wheels 11 located at a midsection of the trailer frame 8, in the illustrated embodiment, whereby the trailer 1 is a semi-trailer. During nonuse, the trailer 1 may be parked and set up on legs 12 located at the front end 9. The legs 12 are extendable or retractable by operation of cranks 14 associated with the legs 12. Preferably, the trailer frame 8 is an open elongated, rectangular structure consisting of longitudinal members 15, standards 16, cross members 17, and braces 18 where necessary. The braces 18 may also function to prevent the bales 3 from rolling off the side of the trailer during turns encountered in transportation. It is desirable that the trailer 1 be constructed in the maximum dimensions allowable on the highway; and in the present embodiment, the trailer 1 may carry a maximum of seven standard round bales, as illustrated in FIG. 9.

The lift fork 2 includes a fork support frame 20 with a pair of bale engaging legs or tines 21 extending therefrom for engagement with the lower disposed portion of the cylindrical surface of the bale 3. The fork support frame 20 is connected by an arm structure 22 to lifting means 23 and revolving means 24 located on the trailer frame 8.

With reference to FIG. 13, the trailer frame 8 includes a guide shaft 26 mounted for rotation about a vertical axis. The guide shaft 26 is nonround in cross section, preferably square, and includes a similarly shaped sleeve 27 slidably received thereon. The guide shaft 26 includes an ear 28 projecting therefrom, and the sleeve 27 includes a similar ear 29. A linear motor, such as an hydraulic cylinder 31, is connected between the ears 28 and 29 and is operable to move the sleeve 27 along the guide shaft 26 upon extension or retraction thereof. In order to accommodate the long lifting stroke desired of the lift fork 2, it is preferred that the cylinder 31 include multiple telescoping pistons 32.

The revolving means 24 may be any suitable motor means for effecting rotation of the guide shaft 26. In the illustrated trailer 1, the revolving means 24 includes a linear motor, such as the hydraulic cylinder 34 having an extendable rod 35 with a rack 36 connected thereto for axial translation upon extension or retraction of the rod 35. The guide shaft 26 includes a pinion 37 affixed thereto and engaged by the rack 36. Upon axial translation of the rack 36, the pinion 37, and therefore the shaft 26, are rotated. While the revolving means 24 could be constructed using a single hydraulic cylinder 34, the preferred revolving means 24 includes a second cylinder 38 mounted in axially spaced and aligned relation to the cylinder 34 and having an extendable rod 39 in opposing relation to the rod 35, with the rack 36 connected between the rods 35 and 39 (see FIG. 14). The cylinders 34 and 38 cooperate in such a manner that one of the rods 35 is caused to extend during the retraction of the other rod 39. The use of two hydraulic cylinders 34 and 38 results in positive engagement between the rack 36 and the pinion 37 without the need for a guide mechanism for the rack 36. Further, since the angle of rotation of the shaft 26 is limited to 180°, relatively short cylinders may be used.

It is desirable to limit the rotation of the shaft 26 to 180° in order to protect the hydraulic hoses connected to the lift cylinder 31 which revolves with the shaft 26 and also to protect the rack and pinion, 36 and 37. In the illustrated embodiment, rotation of the guide shaft 26 is limited by stops 41 and 42 positioned for engagement by the ears 28 supporting the lift cylinder 31, at the extremities of the desired rotation. As illustrated, the stops are mounted on a box structure 43 which encloses the rack and pinion 36 and 37. The box structure 43, along with the cylinders 34 and 38 are attached to a lower longitudinal member 44 of the trailer frame 8. Because of the weight carried by the guide shaft 26 and the moments acting thereon, is necessary that the shaft 26 be sturdily mounted. Therefore, the trailer frame 8 includes a pillow block 45 mounted on an upper longitudinal member 46 and having an upper cylindrical shaft portion 47 of the shaft 26 received in a bearing arrangement therein. In a similar manner, the lower end of the shaft 26 includes a cylindrical shaft portion 48 received in a similar pillow block (not shown) mounted on the lower longitudinal member 44.

Returning to FIG. 1, the fork support frame 20 is connected to the sleeve 27 by means of the arm structure 22. During engagement of a bale 3, in the position shown in FIG. 1, it is desirable to prevent tendencies of the lift fork to be revolved toward the rear by the weight of the bale. For this purpose, the trailer 1 includes a stop member 50 deployable for engagement by the support frame 20. The stop member 50 is illustrated in a retracted position in FIG. 2 and in an extended position in FIG. 3. The stop member 50 includes a bracket 51 formed by a pair of arms 52 having inner ends thereof hingedly attached to the lower longitudinal member 44. The stop member further includes a bumper 53 for engagement by the portion of the fork support frame 20. Referring to FIG. 15, the frame member 44 includes hinge members, such as channels 54, having the inner ends of the arms 52 received therein and pivoting on pivot pins 55. Abutment between the hinge members 54 and a lower surface of the arms 52 limits the pivoting of the stop member 50 in the horizontal or extended position. In order to retain the stop member 50 in a retracted position, especially for highway travel, the stop member includes a lock means 57, such as an ear 58 mounted on the frame member 44 and a similar ear 59 mounted on one of the arms 52. The ears 58 and 59 include respective apertures 60 and 61 therethrough which are alignable in the vertical position of the stop member 50 to receive a pin (not shown) to thereby retain the stop member 50 in the vertical position. The stop member 50 may include motor means (not shown) for pivoting same between the extended and retracted positions; however, in the preferred embodiment, the stop member 50 is pivoted manually.

The conveyor 4 may be any suitable type of conveyor; and in the illustrated trailer 1, the conveyor 4 includes an endless belt 64 extending along substantially the entire length of the trailer frame 8 and powered by a motor 65 to move the bales 3 to the desired position along the trailer frame 8. Preferably, the trailer frame 8 includes conveyor supporting rails 66 and 67 (see FIG. 3) extending along the bed of the frame 8 and having support rollers 69 rotatably mounted therebetween. The conveyor 4 may be powered by any suitable type of motor at any suitable location along the conveyor. With reference to FIG. 11, the preferred conveyor 4 includes a rotary hydraulic motor 65 connected to a right angle gearing mechanism 71 which is operatively connected to a drive roller 72. The conveyor belt 64 passes around a pair of direction changing rollers 73 and around the driving roller 72. The hydraulic motor 65 is reversible, as indicated by the arrows 74, whereby the bales 3 may be moved toward the rear end 5 of the trailer frame 8 or toward the front end 9 thereof. It is desirable that the conveyor belt 64 be smooth enough to allow slippage between the belt 64 and a bale thereon under some circumstances.

Summarizing use of the self loading multiple bale trailer 1: the trailer 1 is hitched to a tow vehicle (not shown) such as a pickup truck or tractor. It is then driven to the field for the loading of bales 3 thereon in substantially the condition illustrated in FIG. 2, that is, with the lift fork 2 in a stowed position and with the stop member 50 in a retracted position. In preparation for the loading of bales, the stop member 50 is released and deployed into the horizontal or extending position as illustrated in FIGS. 3 through 8. The lift cylinder 31 is actuated to lift the fork 2 into a position as illustrated in FIG. 4. The cylinders 34 and 38 are actuated to revolve the lift fork 2 through an angle of approximately 180°, as symbolized by the dotted arc 76 in FIG. 3, to a position as illustrated in FIG. 5. The cylinder 31 is again actuated to drop the lift fork 2 to a bale engaging position as illustrated in FIG. 6 and in FIG. 1.

The tow vehicle propels the trailer forward in order to engage the fork tines 21 with a bale 3 which is lying on one side of its cylindrical surface. During bale engagement, the tendency of the lift fork 2 to revolve rearwardly is resisted by abutment of the fork support frame 20 against the bumper 53 of the stop member 50. When the bale 3 is securely on the tines 21, the lift cylinder is actuated to raise the lift fork 2 high enough for clearance of stop member 50, after which the cylinders 34 and 38 are actuated to rotate the lift fork 2 to a position over the conveyor 4 as shown in FIG. 7. The lift motor 31 is actuated to lower the bale 3 onto the surface of the conveyor as shown in FIG. 8, and the conveyor motor 65 is activated to transfer the bale 3 to a more rearward position to make room for the next bale.

As the second loaded bale and each subsequent one is desposited onto the conveyor, the conveyor is actuated to bring the previously loaded bales up into contact with the just-loaded bale so that the bales may be stacked closely along the conveyor 4. During the movement of the bales into contact with the just loaded bale, it is necessary for the conveyor belt 64 to slip relative to the just-loaded bale. After the last bale has been loaded, the previously loaded bales are brought forward into contact with the last loaded bale; and the stop member 50 is pivoted into and locked in the retracted position, thereby rendering the trailer 1 ready for travel, along the highway if necessary, to a location of storage or use of the bales 3.

Referring to FIG. 10, the trailer 1 may be off loaded by moving the conveyor belt 64 toward the rear end 5 of the trailer during slow forward motion of the trailer 1. Preferably, the trailer 1 includes an off-loading ramp 77 which may be connected to the rear end 5 of the trailer so that the bales 3 do not tumble over onto the flat sides thereof during off loading. After the last bale 3 has been off loaded, the ramp 77 may be disconnected and stored for future use, as in a suitable rack (not shown) beneath the trailer 8. The trailer 1 is then ready to return to the fields for another load of bales. In the preferred embodiment of the present invention, the trailer 1 is able to hold a maximum of seven standard round bales thereon when the trailer frame 8 is built to a maximum legal highway length.

It is to be understood the hydraulic cylinders 31, 34, 38, and the motor 65 are connected to a suitable source of hydraulic fluid under pressure including a pump and fluid reservoir (not shown). The components of such a system may be mounted on the trailer frame 8 or may be carried by the tow vehicle. The trailer 1 may be towed by a large tractor, such as are used in modern agriculture. Such tractors are generally equipped with hydraulic systems. It is desirable for the loading of bales 3 and off loading thereof to be a one man operation, in order to realize the maximum efficiency and economy of the trailer 1. Therefore, the trailer 1 includes suitable hydraulic controls to actuate the various hydraulic cylinders and motors and may include suitable signaling devices, such as a signal to alert the operator that a bale 3 is approaching the rear end of the trailer 1, in order to prevent undesired off loading thereof. Further, while the lifting and rotating arrangements and conveyor drive arrangement have been described in terms of hydraulic systems, and while such hydraulic systems are preferable because of their already widespread use in agriculture, the trailer 1 is not to be limited thereto.

FIGS. 16 through 20 illustrate a modified form of the lift member 2 wherein a bale engaging spike 80 is substituted for the tines 21. The spike 80 is adapted for engagement of a bale 3 by penetration thereof into a center or axial portion 81 of an end 82 of the bale. The spike 80 can be penetrated into the bale 3 by proper alignment of the spike with the bale and subsequent forward motion of the trailer 1; however, the spike 80 is most conveniently utilized by an arrangement providing for powered extension and retraction thereof.

Referring to FIG. 16, the spike 80 is supported by a spike support frame 83, similar to the fork support frame 20. A center member 84 of the frame 83 includes a collar 85 having the spike 80 slidably received therethrough. The collar 85 may include means such as a gusset 86 connected to the center member 84 for added strength. Any suitable motor means may be employed for extension and retraction of the spike 80; and, in the illustrated embodiment, an hydraulic motor 87 is connected by suitable gearing (not shown) enclosed in a housing 88 to a pinion (not shown) engaged with a rack 89. Preferably, the rack 89 is recessed in the under surface of the spike 80 to inhibit clogging of the rack 89 with hay. The motor 87 is reversible whereby actuation thereof is operative to extend or retract the spike 80.

The spike support frame 83 is connected by an arm structure 91 to a non-round sleeve 92 slidable on a non-round guide shaft 93. The arms 91, sleeve 92, and shaft 93 are substantially similar to the arms 22, sleeve 26, and shaft 27 of the preferred form previously described. It is desirable that the spike 80 be raised and lowered in a half turn position as illustrated in FIGS. 18, 19, and 20. Therefore, the arms 91 are attached by a side portion thereof to the sleeve 92 instead of by the ends thereof. If necessary, suitable shims (not shown) can be included therebetween in order to position the arms 91 for clearance of the lower longitudinal member 44 of the trailer frame 8. In addition, the stop member 50 must be omitted or replaced by a modified stop member 95 (see FIG. 17) which does not interfere with the manipulation of the spike support frame 83. The modified stop member 95 may, for example, include a stop arm 96 mounted on the underside of the longitudinal member 44 and pivotable about the pin 97 in order to position a bumper member 98 thereon for engagement by one of the arm members 91. A brace member 99 is also pivotable from below the longitudinal member 44 for connection with the stop arm 96 by means of a lock pin 100. During nonuse of the modified stop member 95, the lock pin 100 may be released and the arm 96 and brace 99 pivoted to position below the longitudinal member 44 for retention thereunder.

The spike 80 may be employed to engage, lift, and deposit the bales 3 onto the conveyor 4 as previously described. However, the spike 80 has further use in manipulating the cylindrical bales 3. The cylindrical bales 3 are formed by rolling hay in a spiral manner until the standard size is reached. When the bales 3 are placed for consumption by cattle, the bales are sometimes unrolled on the ground so that a large number of cattle may have simultaneous access to the hay. FIGS. 18 and 19 illustrate the use of the spike 80 for unrolling a cylindrical bale 3.

In order to unroll a bale, the spike 80 with the bale 3 thereon is moved approximately 90° to a position at the side of the trailer frame 8 and lowered to a position in contact with the ground as shown in FIG. 19. The bale twine is cut and a first layer of the bale is separated by hand. The trailer is then driven forward, and frictional contact between the bale 3 and the ground causes the bale to rotate about the spike 80 whereby the bale is unrolled leaving an elongated layer 101 of hay along the ground thereby providing access thereto by a large member of cattle. It will be recognized that the bale 3 must be oriented properly on the spike 80 (as shown in FIG. 19) for the bale to unroll. It will often be desirable to lower the bale during unrolling in order to maintain contact between the bale and the ground.

FIG. 20 illustrates the use of the modified lift member 79 for depositing a bale 3 in a hay ring 102. The hay ring 102 is a cylindrical enclosure with apertures 103 in the sides thereof for access by cattle to the hay enclosed in the ring 102. In order to deposit a bale in the hay ring 102, the bale 3 is engaged and lifted from the conveyor 4 and rotated to the side position. The bale is then lifted to clear the upper rim 105 of the hay ring, and the trailer 1 is driven to a position next to the hay ring. The bale is then released from the spike 80 by retraction thereof. The spike support frame 83 may be provided with projections 104 near the bottom thereof to engage the lower periphery of the bale to thereby cause the bale to tip over onto one of the ends 82 thereof during deposition into the hay ring 102. The projections 104 are either retractable or removable, such as by unscrewing same, in order to prevent interference thereby during the unrolling of a bale. In some instances, as where tall hay rings are used, it may be desirable to provide a suitable ramp or mound next to the hay ring in order to position the trailer 1 and the bale 3 high enough to easily clear the top rim 105 thereof.

While certain forms of the present invention have been described and illustrated, it is not to be limited thereto except insofar as such limitations are included in the following claims.

I claim:
1. A bale handling apparatus comprising:
   (a) a trailer frame including a traverse conveyor and ground engaging wheels; said frame being adapted for combination with compatible propulsion means; said conveyor adapted for receiving a large cylindrical hay bale thereon;
   (b) a bale engagement member having a bale engagement position wherein said member engages one of the bales in a field and a bale release position wherein one of the bales is released onto said conveyor; said member including engagement means for selectively holding one of the bales between said bale engagement position and said bale release position;
   (c) arm means having a first end connected to said bale engagement member and a second end connected to a side of said frame; said arm means spacing said bale engagement member from said second end of said arm means such that when said bale engagement member is in the release position thereof, the bale being released therefrom is generally laterally centered in said frame;
   (d) lifting means connected to said frame and operable to raise and lower said bale engagement member relative to said frame; and
   (e) revolving means connected to said frame and operable to revolve said bale engagement member about a substantially vertical axis;
   (f) said vertical axis being located at a side of said trailer frame whereby bales are engaged laterally of said frame during forward motion of said frame;
   (g) whereby a bale located in a field on said bale engaging member side of said frame may be translated from said field to said frame such that the surface of said bale engaging said field is engaging said frame.

2. An apparatus as set forth in claim 1 including:
   (a) a non-round guide shaft mounted on said frame for rotation about a substantially vertical axis of said shaft;
   (b) a non-round sleeve slidably received on said shaft;
   (c) arm means connecting said bale engagement member to said sleeve;
   (d) said revolving means including a rotation motor connected to said frame and operable to rotate said shaft; and
   (e) said lifting means including a lifting motor connected between said shaft and said sleeve and operable to raise and lower said sleeve on said shaft.

3. An apparatus as set forth in claim 2 wherein said revolving motor includes:
   (a) a pair of hydraulic cylinders connected to said frame in axially spaced, aligned relation;
   (b) said cylinders including respective mutually opposing pistons and cooperating to extend one of said pistons simultaneous with the retraction of the other piston;
   (c) an elongated rack connected between said pistons; and
   (d) a pinion connected to said shaft, engaged by said rack, and rotated by translation of said rack.

4. An apparatus as set forth in claim 2 wherein:
(a) said lifting motor is an hydraulic cylinder; and
(b) said cylinder includes multiple, telescoping extendible pistons.

5. An apparatus as set forth in claim 1 wherein said revolving means includes:
(a) a linear motor mounted on said frame and having an extendable rod;
(b) a rack connected to said rod for longitudinal translation upon extension or retraction of said rod; and
(c) a pinion operably connected to said bale engagement member, said pinion being engaged and rotated by said translation of said rack.

6. An apparatus as set forth in claim 5 wherein: said linear motor is an hydraulic cylinder.

7. An apparatus as set forth in claim 1 wherein:
(a) said conveyor includes an endless conveyor belt; and
(b) said belt is sufficiently smooth enough to allow selective slippage between said belt and a bale thereon.

8. An apparatus as set forth in claim 1 wherein said bale engagement member includes:
(a) a bale lift support frame;
(b) a pair of parallel bale engaging tines projecting from said support frame; and
(c) said tines are positioned on said support frame for engagement with a lower disposed portion of the cylindrical surface of said bale when said bale is lying on said cylindrical surface.

9. An apparatus as set forth in claim 1 wherein said bale engagement member includes:
(a) a bale lift support frame;
(b) a single bale engaging spike projecting from said support frame; and
(c) said spike is positioned on said support frame for penetration into an axial portion of said bale when said bale is lying on the cylindrical surface thereof.

10. An apparatus as set forth in claim 9 including:
spike motor means mounted on said support frame and operable to extend or retract said spike relative to said support frame.

11. A bale handling apparatus comprising in combination:
(a) a trailer frame including ground engaging wheels and hitch means for connection of said frame to a tow vehicle;
(b) a bale engagement member mounted on said frame and operable to engage, hold and release a large cylindrical bale;
(c) lifting means connected to said frame and operable to raise and lower said bale engagement member relative to said frame;
(d) revolving means connected to said frame and operable to revolve said bale engagement member about a substantially vertical axis; and
(e) a stop member connected to said frame and engaged by said bale engagement member to prevent rotation thereof during engagement of a bale thereby.

12. An apparatus as set forth in claim 11 wherein said stop member includes:
(a) a bracket hingedly connected to said frame for selective pivoting to a position projecting from the side of said trailer; and
(b) a bumper member positioned on said bracket for abutment by said bale engagement member during said engagement of a bale.

13. In a self loading bale trailer including an elongated trailer frame having a conveyor extending along a bed of said trailer, hitch means for connection to a tow vehicle, and a bale engagement device operative to engage a large cylindrical bale from a side of said trailer by forward motion of said trailer and movable to load said bale onto said conveyor, said bale engaging device including a support frame therefor, the improvement comprising:
(a) lifting means connected to said trailer frame and operable to raise and lower said support frame relative to said trailer frame;
revolving means connected to said trailer frame and operable to revolve said support frame about a vertical axis through an angle of about 180°;
(c) a stop member connected to said trailer frame and engaged by said support frame during engagement of a bale by said bale engagement device to limit the revolution of said support frame; and
(d) said conveyor including an endless conveyor belt which is sufficiently smooth to allow selective slippage between said belt and a bale thereon.

14. A bale trailer as set forth in claim 13 including:
(a) a non-round guide shaft rotatably mounted on said trailer frame;
(b) a non-round sleeve slidably received on said shaft;
(c) arm means connecting said support frame to said sleeve;
(d) a rotation motor mounted on said trailer frame and operable to rotate said shaft; and
(e) a lifting motor connected between said shaft and said sleeve and operable to raise and lower said sleeve on said shaft.

15. A bale trailer as set forth in claim 14 wherein said rotation motor includes:
(a) an hydraulic cylinder mounted on said trailer frame and having an extendible rod;
(b) an elongated rack connected to said rod for longitudinal translation upon extension or retraction of said rod; and
(c) a pinion connected to said shaft, engaged by said rack, and rotated by said translation of said rack.

16. A bale trailer as set forth in claim 14 wherein said rotation motor includes:
(a) a pair of hydraulic cylinders connected to said trailer frame in axially spaced, aligned relation;
(b) said cylinders including respective mutually opposing pistons and cooperating to extend one of said pistons simultaneous with the retraction of the other piston;
(c) an elongated rack connected between said pistons;
(d) a pinion connected to said shaft, engaged by said rack, and rotated by translation of said rack.

17. A bale trailer as set forth in claim 14 wherein:
(a) said lifting motor is an hydraulic cylinder; and
(b) said cylinder includes multiple, telescoping pistons.

18. A bale trailer as set forth in claim 13 wherein said bale engagement device includes:
(a) a pair of parallel bale engaging tines projecting from said support frame; and
(b) said tines are positioned on said support frame for engagement with a lower disposed portion of the cylindrical surface of said bale when said bale is lying on said cylindrical surface.

19. A bale trailer as set forth in claim 13 wherein said bale engagement device includes:

(a) a single bale engaging spike projecting from said support frame; and (b) said spike is positioned on said support frame for penetration into an axial portion of said bale when said bale is lying on the cylindrical surface thereof.

20. A bale trailer as set forth in claim 19 including: spike motor means mounted on said support frame and operable to extend or retract said spike relative to said support frame.

* * * * *